United States Patent
Denter et al.

(10) Patent No.: US 6,787,699 B1
(45) Date of Patent: Sep. 7, 2004

(54) GROUNDING PLATE AND TELECOMMUNICATIONS MODULE INCLUDING A GROUNDING PLATE AND TELECOMMUNICATIONS RACK MOUNTING SYSTEM INCLUDING A MODULE

(75) Inventors: Friedrich Denter, Castrop-Rauxel (DE); Dietrich Schluter, Dorsten-Emmelkamp (DE)

(73) Assignee: 3M Innovative Properties Company, St. Paul, MN (US)

( * ) Notice: Subject to any disclaimer, the term of this patent is extended or adjusted under 35 U.S.C. 154(b) by 130 days.

(21) Appl. No.: 10/461,125

(22) Filed: Jun. 13, 2003

Related U.S. Application Data

(63) Continuation of application No. PCT/EP01/15282, filed on Dec. 21, 2001.

(30) Foreign Application Priority Data

Dec. 21, 2000 (DE) .......................................... 100 64 089

(51) Int. Cl.⁷ ................................................ H05K 5/02
(52) U.S. Cl. .................... 174/51; 174/40 CC; 174/135; 439/98; 439/100
(58) Field of Search .............................. 174/51, 40 CC, 174/135, 35 C, 6, 78; 439/98, 95, 100; 361/799, 753

(56) References Cited

U.S. PATENT DOCUMENTS

| | | | |
|---|---|---|---|
| 4,960,964 A | * 10/1990 | Schnell et al. ................. | 174/51 |
| 5,790,363 A | 8/1998 | Chaudhry | |
| 5,942,725 A | * 8/1999 | Daoud ......................... | 174/51 |
| 6,151,392 A | 11/2000 | Castonguay et al. | |
| 6,194,652 B1 | 2/2001 | Ivan | |
| 6,362,425 B1 | * 3/2002 | Chilton et al. ................. | 174/51 |
| 6,587,355 B2 | * 7/2003 | Park et al. ................... | 361/799 |

FOREIGN PATENT DOCUMENTS

| | | |
|---|---|---|
| EP | 0 524 115 A1 | 1/1993 |
| EP | 0 658 048 A2 | 6/1995 |
| EP | 0 658 058 A3 | 12/1998 |
| EP | 1 005 235 A2 | 11/1999 |
| FR | 2310962 | 9/1997 |
| GB | 93 10 953 | 8/1993 |

OTHER PUBLICATIONS

International Search Report—PCT/EP 01/1582.

* cited by examiner

*Primary Examiner*—Dhiru R Patel
(74) *Attorney, Agent, or Firm*—John J. Trussell

(57) ABSTRACT

A grounding plate (10) includes the following features: said grounding plate (10) includes in its rear portion at least one contact section (18) integrally formed with said grounding plate (10) for contacting a telecommunications rack-mount (50), said grounding plate (10) is configured essentially flat, including said contact section (18) and with the exception of comparatively short angled items (24), if any, which serve for positioning said grounding plate (10) in or on a telecommunications module (30) relative to a direction perpendicular to the sheet-metal plane of said grounding plate (10), said grounding plate (10) includes in its front portion several contact fingers (12), said grounding plate (10) can be mounted on a telecommunications module such that each contact finger (12) is in contact with a section of a contact of the module, and said grounding plate (10) can be mounted together with the module on a telecommunications rack-mount such that said contact section (18) is in contact with a mainly troughed telecommunications rack-mount, said telecommunications module is provided with one such grounding plate (10) and said telecommunications rack-mounting system is provided with at least one such module.

17 Claims, 2 Drawing Sheets

GROUNDING PLATE AND TELECOMMUNICATIONS MODULE INCLUDING A GROUNDING PLATE AND TELECOMMUNICATIONS RACK MOUNTING SYSTEM INCLUDING A MODULE

This application is a continuation of international Application No. PCT/EP01/15282 filed Dec. 21, 2001.

FIELD OF THE INVENTION

The invention relates to a grounding plate for mounting in a telecommunications module, it also relates to a telecommunications module including one such grounding plate and a telecommunications rack-mounting system including such a module.

Transmission systems, with the aid of which data and voice signals are communicated at relatively high transmission rates, are finding increasing use in telecommunications. This makes it necessary to shield the components involved in transmission, i.e. both the individual cable cores as well as the modules, and more particularly the junction blocks terminating the cable cores, by suitable means so that the electromagnetic interference (EMI) protection requirements are satisfied. In this respect, it is especially important to shield cables forming a pair that comprise a shielding wire. At a junction module this shielding wire needs to be grounded to drop the voltages induced therein to ground.

BACKGROUND

DE 198 50 679 A1 discusses the case of a junction block for high transmission rates having the shielding wires of the individual pairs on the side contacts of the block. These side contacts connect to a relatively complicated grounding element which produces via side sections a conducting connection to sections of the rack-mounting system thereby connecting the shielding wires to ground. Experience has shown this solution may be a disadvantage in that the grounding elements are of relatively complicated design and the shielding wires terminate in a middle portion of the junction block so they need to be brought out to the side portions of the block which is a nuisance because it clutters and complicates the wiring of the junction block.

A junction and disconnecting block comprising a ground connecting element provided with what is called a "projecting member" for supporting, mounting and contacting the shielding of an incoming cable is discussed in EP 0 658 059 A1. So-called "multiple projecting members" are provided in its front portion for contacting shielding wires. In a rear portion, small tabs, to which separate resilient means for contacting the rack-mount are secured, are notched from a sheet-like grounding element. In this manner, the earth connecting element electrically contacts the rack-mount.

SUMMARY OF THE INVENTION

The invention is directed to providing a grounding element for comparatively cost-effective production permitting both an uncluttered and more reliable circuiting of a telecommunications module and safer grounding of the shielding wires of terminated pairs.

According to the invention, a contact section integrally formed with the grounding plate is provided on the rear portion of the grounding plate which serves to make contact with a telecommunications rack-mount. In one embodiment the grounding plate can be rack-mounted together with a telecommunications module so that the contact section is in contact with the troughed rack-mount. In this arrangement the configuration of the rack-mount or rack-mounting system can vary as long as it comprises one or more sections capable of electrically contacting the module at which the rear contact section of the grounding plate to electrically connect to the rack-mount. One such rack-mount may be provided as a rack-mount cross-section of practically any configuration, although it is preferred in this context that the cross-section is a relatively shallow "top-hat" cross-section with the "hat" open in a direction facing away from the module. The flat surface of the "hat" forms the portion at which the rear contact section contacts the rack-mount.

Furthermore a troughed rack-mount may be provided, it being understood that a troughed rack-mount in this context comprises a rear wall or a rear section corresponding to the bottom of the "trough" to which the rear side of a telecommunications module is fitted. Accordingly, also the rear portion of the grounding plate faces the bottom of the trough and the contact section can make contact with the trough by an extremely simple configuration of the grounding plate. In other words, the voltage induced in the shielding wires is now conducted via the contacts of the module to the contact fingers of the grounding plate, from which it is dropped to the rack-mounting system by particularly simple ways and means more or less in a straight line from front to rear via the contact section.

Generally, the grounding plate comprises a front portion and a rear portion. In its front portion, the grounding plate comprises several contact fingers, which are described in more detail below. In its rear portion, the grounding plate comprises the contact section, which is described above. As regards the contact section, it should be noted that any structure, which is adapted to contact a telecommunications rack-mount, is conceivable. In particular, the grounding plate can comprise, in its rear section, a suitable tab, finger or point extending from the rear section so as to perform the above-mentioned function. Furthermore, the rear edge of the grounding plate could be used as the contact section. Furthermore, the grounding plate can be practically flat so that it can be made by a simple stamping process with relatively few or no complicated angles. The only angled items can be relatively short tabs angled from the plane of the grounding plate to ensure reliable positioning of the grounding plate in a telecommunications module for certain applications.

The grounding plate is adapted for use with telecommunications modules in which the shielding wires of terminated pairs are connected to the "usual" contacts of the module. That means no separate shielding wire placement may be required to install the grounding plate. Instead, the individual contacts of the module are used (configured identical to the contacts terminating the regular cores to terminate the shielding wires of the pairs). In order to ground the shielding wires, the grounding plate can comprise several contact fingers in its front portion. Furthermore, the grounding plate can be mounted in or on a telecommunications module such that each of the individual contact fingers contacts a section of a module contact. More particularly, the contact fingers contact sections of the contacts provided for placing shielding wires.

"Front portion" in this context is understood to be the portion of the grounding plate that faces the side of the module where the contacts are located. The contact fingers are positioned on the grounding plate so that they contact the contacts provided for placing the shielding wires. This is why the grounding plate can be directly compatible with diverse module configurations. In other words, for a module on which contacts other than those as provided usually for placing the shielding wire, all that is needed now is to suitably adapt the positioning of the contact fingers on the grounding plate.

It is to be noted that the salient advantage afforded as compared to prior art is that a reliable dropping to ground is now achievable by a relatively simple and cost-effective component, whereas hitherto overvoltage protection magazines and links to connect the shielding wires to ground had to be used. These can be replaced by the invention. Since the number of contact points between separate elements can be minimized, and a simple, relatively flat grounding plate can be used, the transmission to ground is significantly improved. Furthermore the relatively flat grounding plate enhances the shielding effect and minimizes crosstalk between the two sides of a telecommunications module. In conclusion, the invention can be positioned in a module between the contacts of the module and its rear portion so that front access to the contacts of the module is not obstructed. Accordingly, placing and contacting jumper and test leads continues to be possible in the region of the contacts provided with shielding wires.

As already mentioned, the grounding plate can be relatively flat. However, in accordance with one preferred embodiment relatively short angled tabs are provided, particularly at side edges of the grounding plate, for positioning the grounding plate in or on the module. Preferably two angled tabs are provided on each side edge of the grounding plate. The tabs on each side extend in opposite directions from each other permitting the grounding plate to be reliably centered in a module containing one or more slotted opening (s) typically used for mounting an overvoltage protection magazine.

To correctly locate the grounding plate in or on the module it is good practice to provide at least one stop on the grounding plate.

For example, by providing at least one stop on the outline of the contact fingers.

To make contact between the contact section of the grounding plate and the troughed rack-mount it is good practice to provide a pointed projection on the contact section. The sharp edged tip can be used to scrape off any oxide film formed on the rack-mount. This achieves, especially when a turning action is involved in mounting a module grounding plate assembly in a rack-mounting system at least a slight scraping of the oxide film which lowers the contact resistance at this location. This turning action may be accomplished by latching the module first to one side of the rack mounting system before latching it to the other side so that the grounding plate is slightly turned about an axis perpendicular to the plane of the grounding plate and the contact section, more particularly with its pointed tip, covers a certain distance over the surface of the troughed rack-mount.

To ensure a snug contact of the contact section of the grounding plate with the troughed rack-mount and thus a safe electrical contact, it is good practice to provide a springy contact section that "gives" slightly when in contact with the troughed rack-mount ensuring a good electrical contact. The springy property of the contact section can be achieved by providing a relatively narrow tab, which can lie in one plane with the grounding plate and extends from the rear portion of the grounding plate. Furthermore, a tab extending from the rear portion of the grounding plate can be stamped from the latter and bent in the direction extending distally from the rear portion of the grounding plate so as to form a contact section for contacting a rack-mount.

In this context it is preferred that a slot is provided in the vicinity of the contact section of the grounding plate. The slot can extend transversely to the direction extending from the front to the rear portion of the grounding plate, along the contact section, enabling the contact section to give, at least slightly, in a direction perpendicular to the elongation of the slot so that the contact section spring-contacts the troughed rack-mount. Preferably, the slot is located near the rear edge of the grounding plate, i.e. near the contact section so as to allow the contact section to "give" when pressure is applied thereto.

A particularly advantageous embodiment of the grounding plate consists in it comprising, preferably at the above-mentioned angled tabs, supporting means for a printed circuit board. It is noted that the grounding plate displays its special advantages together with a telecommunications module which comprises at least one electronic component, in particular a splitter component provided on one or more printed circuit boards. The grounding plate can be used to advantage in such a module to support and fix in the module one or more printed circuit boards. For example, the supporting means can consist of either suitable latching or snap-action means into which a printed circuit board may be inserted or snapped.

It is advantageous to provide the grounding plate with one or more openings, apertures or slots, through which thick or tall electronic components can project. For example, relatively high electronic components provided on a printed circuit board which is supported by the grounding plate can be accommodated in such a slot. Since a fully completed or closed configuration of the grounding plate is not absolutely required in these areas for shielding purposes, an advantageous construction results from providing slots into which the electronic components of the printed circuit board extend. These slots are preferably located, in contrast to the slot on the outline of the contact section, at the "interior" of the grounding plate.

To prevent corrosion and to durably maintain the favorable springy response of the grounding plate in accordance with the invention it is good practice to make the grounding plate of stainless steel.

Although the grounding plate in accordance with the invention may be provided without a corresponding telecommunications module and it is suitable for retrofitting telecommunications modules, it is preferred to provide a fully-fitted module, more particularly a junction block, comprising a certain dimension with regard to the direction from the front to the rear portion already equipped with the grounding plate. In this arrangement, it is preferred that the grounding plate and the module equipped are adapted to each other such that the contact fingers of the grounding plate extend at least slightly into the contacts of the module. For example, the contact fingers may be inserted into a disconnecting, separating or isolating location existing on the contacts of the module. As mentioned, it is particularly advantageous if the module comprises at least one electronic component, e.g. a splitter component, on at least one printed circuit board.

Furthermore, existing rack-mounting systems can be retrofitted with modules in accordance with the invention. It is, however, preferred to provide a complete rack-mounting system together with several modules in accordance with the invention each equipped with the grounding plates to ensure optimum fit and electrical contact. In this arrangement, it is preferred that the grounding plate is the sole component ensuring electrical connection between the contacts of the module and the rack-mount. Accordingly, the grounding plate is preferably provided as a one-piece electrically conducting connection component between the contacts of a module and the rack-mount.

BRIEF DESCRIPTION OF THE DRAWINGS

The invention will now be detailed by way of example embodiments as shown in the drawings in which.

DETAILED DESCRIPTION OF PREFERRED EMBODIMENTS OF THE INVENTION

Figure 1:
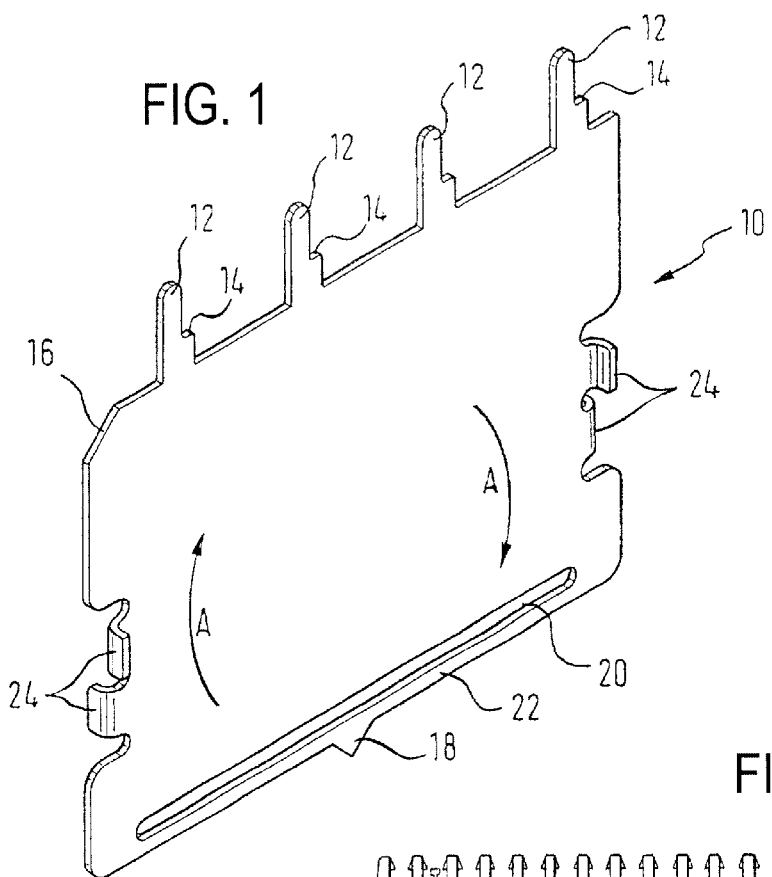
FIG. 1 is a view in perspective of a grounding plate in accordance with the invention.

Referring now to FIG. 1 there is illustrated the grounding plate 10 shown in an upright position, although as when it is mounted together with a telecommunications module in a rack-mounting system its orientation would be horizontal so that the contact fingers 12 evident at the top in FIG. 1 are located in the front portion of the grounding plate 10. As mentioned, contact fingers 12 are provided in the front portion of the grounding plate 10, these being four in the illustrated example, for contacting four contacts (not shown) of a telecommunications module (likewise not shown). The aforementioned contacts on the module serve to connect shielding wires therewith. The grounding plate 10 as shown in FIG. 1 is adapted for use with a module to which eight pairs can be terminated. It is to be noted, however, that when using the grounding plate, the termination of merely four pairs is provided for, whose shielding wires are correspondingly placed on four selected contacts of the module as contacted by the contact fingers of the grounding plate to ground the voltages induced therein. Thus, when the grounding plate 10 is mounted in or on a telecommunications module the contact fingers 12 contact rear sections of the module contacts on which the shielding wires are placed.

As regards the front side of the grounding plate 10 it is to be noted that a stop 14 is provided directly adjacent to a contact finger in each case, serving to ensure correct positioning of the grounding plate in the module. Arranging the stop 14 in the direct vicinity of the corresponding contact fingers 12 ensures that the contact fingers 12 are positioned correctly relative to the contacts of the module thereby ensuring a reliable electrical contact. Furthermore, the front side edge of the grounding plate 10 can be beveled at one side (beveling on the left-hand side of the grounding plate is shown in FIG. 1), identifying a location 16 to assist correct insertion into a telecommunications module.

Located in a rear portion of the grounding plate 10 as shown is the contact section 18 which is configured with a pointed projection. Provided on the perimeter of the contact section 18, namely parallel to the rear edge of the grounding plate 10, is a slot 20 producing a springy ridge 22 in the rear portion, as a result of which the contact section 18 gives in the direction of the front side of the grounding plate 10 so that, as soon as the contact section 18 comes up against the surface of a troughed rack-mount, contact with the rack-mount is assured. It is to be noted that as an alternative it is just as conceivable to configure the slot 20 such that the resulting ridge 22 contacts the remainder of the grounding plate by one side only. It furthermore being conceivable that by configuring two or more slots two or more springy ridges materialize locating separate contact sections.

The arrows A as shown in FIG. 1 indicate that the grounding plate 10 can be turned about an axis perpendicular to its sheet-metal plane when rack-mounting the grounding plate 10 together with a telecommunications module so that the contact section 18 is moved at least slightly laterally to scrape or scratch off any oxide film from the surface of the rack-mounting system which would otherwise increase the contact resistance.

As evident from FIG. 1 the grounding plate 10 in accordance with the invention can be stamped to advantage practically totally flat, more particularly in a single machining operation. In the example embodiment as shown merely the angled tabs are provided upswept and downswept at the two side edges roughly in the middle along the in-depth extent in the grounding plate 10. However, machining such angled tabs is also a relatively simple operation. In the condition, as provided for in the example embodiment as shown, the grounding plate 10 in accordance with the invention is provided in a slotted opening of a relatively flat and at the same time deep junction block, angled tabs 24 as shown position the grounding plate 10 in the module level, i.e. as regards a direction perpendicular to the sheet-metal plane of the grounding plate 10. It is, of course, also possible to configure the angled tabs differently so that they adapt to a junction module configured otherwise, for instance, only a single angled tab may extend from the side edge in merely one of the two directions. In accordance with the preferred embodiment of a telecommunications junction block as described above, which is relatively flat and comprises a certain in-depth extent, one preferred embodiment of the grounding plate 10 in accordance with the invention consists of it comprising, as shown in FIG. 1, a plate-type configuration instead of a strip-type configuration. In other words the in-depth extent (in FIG. 1 the dimension from top to bottom) is practically the same as the width of the grounding plate 10.

Figure 2:
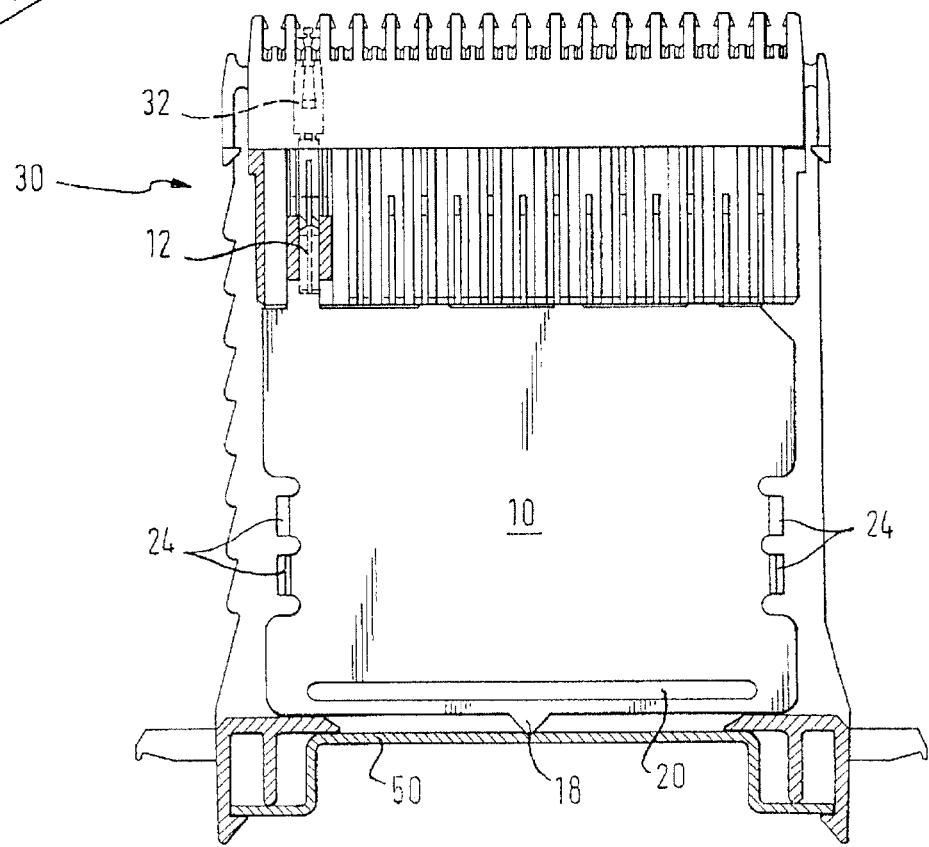
FIG. 2 is a section taken through a rack-mounted telecommunications module provided with a grounding plate in accordance with the invention.

Referring now to FIG. 2 there is illustrated a longitudinal section through a telecommunications module 30 provided with the grounding plate 10 in accordance with the invention. As evident from the lower portion of FIG. 2 the module 30 is mounted in a telecommunications rack-mount 50 by suitable latching hooks so that the rear contact section 18 of the grounding plate 10 in accordance with the invention is in contact with a section of the rack-mount 50. As evident from FIG. 2 furthermore the rack-mount 50 has a top-hat cross-section comprising a relatively low-profile and several modules 30 are mounted thereon so that the opening of the "hat" extends to the rear.

Due to the angled tabs 24 provided on the side of the grounding plate 10 the grounding plate 10 is positioned in a slotted or chute-type opening of the module 30 in a direction perpendicular to its sheet-metal plane, it being evident that, the same as in the upper portion of the grounding plate 10, the contact fingers 12 extend to the contacts 32 of the module 30 so that they "dive" into sections of the contacts 32, they more particularly extending into a parting location configured at the contacts 32 for reliable electrical contact thereof. Accordingly, the voltage induced in the shielding wires as terminated by each of the contacts 32 is conducted from these contacts to the grounding plate 10 in accordance with the invention and from there via the rear contact section 18 to the rack-mount 50. It is to be noted in conclusion that lightening holes may be configured in the grounding plate 10 of any size as needed, for example, to save material and weight. As long as the live path from the contacts of the module to the rack-mount is assured, the arrangement as shown offers the advantages as cited.

Figure 3:
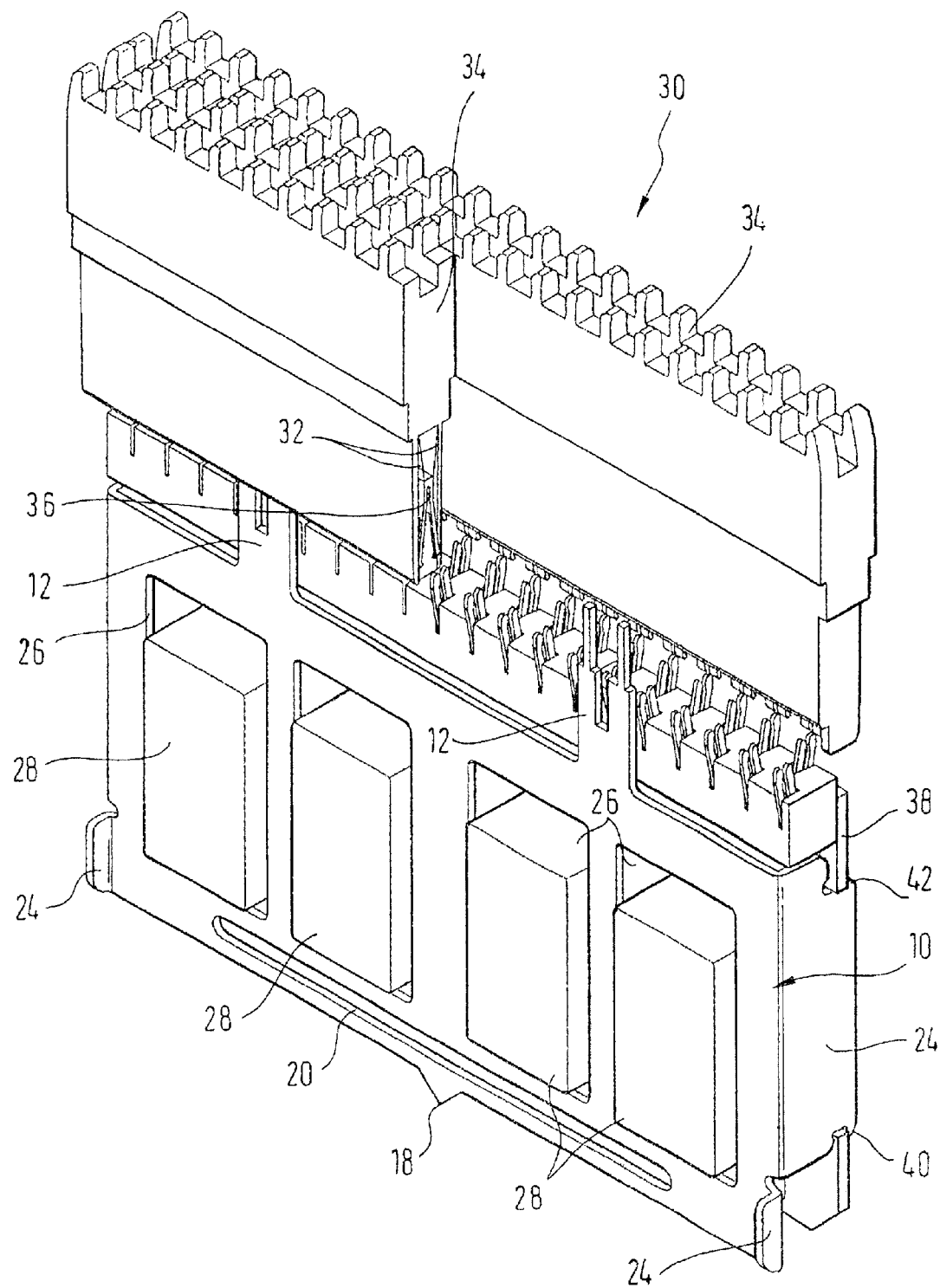
FIG. 3 is a view in perspective of a part of a telecommunications module provided with a grounding plate in accordance with the invention.

Referring now to FIG. 3 there is illustrated in a perspective view a part of a telecommunications module 30 provided with a second embodiment of the grounding plate 10 in accordance with the invention. It should be noted in this context that the contacts 32 of the module 30 as shown are essentially provided in two disconnecting blocks 34 and that the contact fingers 12 of the grounding plate 10 engage into the separating point 36 of contacts onto which the grounded shielding wires of the terminated cable cores are placed.

A special aspect which is evident from the grounding plate as shown in FIG. 3 lies in the grounding plate comprising several comparatively large slots 26 provided for accommodating electronic components 28 mounted to a printed circuit board 38. For example, the printed circuit board 38 can form a splitter component together with the electronic components 28 so that the shown module forms a splitter group. Regarding the details of a module including a splitter component, reference is hereby made to DE 201 04 605 U1 held by a company affiliated to the applicant.

A further aspect of the embodiment of the grounding plate 10 in accordance with the invention as shown in FIG. 3 consists in it comprising special embodiments of lateral angled items 24. These angled items 24 serve, for one thing, as is the case in the embodiment of FIGS. 1 and 2, to position the grounding plate 10 in a module. In particular, comparatively short and flat angled items 24 are provided on the rear side. The longer and somewhat higher angled items 24 provided in the center to front portion of the grounding plate 10 and extending to the other side serve advantageously to support the printed circuit board 38. The printed circuit board 38 of the shown embodiment is more particularly provided with suitable lateral slots so that it may be locked, snapped or inserted into the grounding plate 10. As regards the rear supporting means 40, it should be mentioned that there is provided a slot having a hook-like outline which to a certain extent surrounds the edge of the slot provided on the printed circuit board 38. The front supporting means 42 is similarly designed, causing by suitable dimensions a friction with the edge of the slot on the grounding plate 38 so that the printed circuit board is securely supported.

What is claimed is:

1. A grounding plate comprising:
   at least one contact section integrally formed with said grounding plate said contact section including a rear portion adapted to contact a telecommunications rack-mount,
   wherein said grounding plate and the contact section, are configured relatively flat,
   wherein said grounding plate further comprises a front portion and a plurality of contact fingers at said front portion,
   wherein said grounding plate is adapted to be mounted on a telecommunications module such that each of said contact fingers is in contact with a section of a contact of the module, and
   wherein said grounding plate is adapted to be mounted together with the module on a telecommunications rack-mount such that the contact section is in contact with the telecommunications rack-mount.

2. The grounding plate as set forth in claim 1, further comprising relatively short angled tabs adapted for positioning said grounding plate in or on the module relative to a direction perpendicular to said grounding plate.

3. The grounding plate as set forth in claim 2, further comprising supporting means for supporting at least one printed circuit board.

4. The grounding plate as set forth in claim 3, wherein said supporting means are provided at said angled tabs.

5. The grounding plate as set forth in claim 1 further comprising:
   at least one stop adapted for positioning said grounding plate in or on the module relative to a direction parallel to said grounding plate.

6. The grounding plate as set forth in claim 5 wherein said contact fingers comprise an outer surface and
   said stop is provided on said outer surface of said contact fingers.

7. The grounding plate as set forth in claim 1, wherein said contact section is configured pointed.

8. The grounding plate as set forth in claim 7, wherein said contact section comprises a sharp-edged contact point.

9. The grounding plate as set forth in claim 1, further comprising at least one slot.

10. The grounding plate as set forth in at claim 1, wherein said grounding plate comprises stainless steel.

11. The grounding plate as set forth in claim 1, wherein said grounding plate is mounted to said telecommunications module.

12. The grounding plate as set forth in claim 13, wherein each of said contact fingers extends into said contact provided on said module.

13. The grounding plate as set forth in claim 11, wherein said telecommunications module comprises at least one electronic component.

14. The grounding plate as set forth in claim 13, wherein said electronic component comprises a splitter component.

15. The grounding plate as set forth in claim 11, wherein said telecommunications module comprises a junction block.

16. The grounding plate as set forth in claim 11, wherein said telecommunications module and said grounding plate are mounted in a telecommunications rack-mounting system.

17. The grounding plate as set forth in claim 16, wherein said grounding plate is provided as a one-piece electrically conducting connection component between said contact of said module and said rack-mount.

* * * * *

UNITED STATES PATENT AND TRADEMARK OFFICE
CERTIFICATE OF CORRECTION

| | |
|---|---|
| PATENT NO. | : 6,787,699 B1 |
| DATED | : September 7, 2004 |
| INVENTOR(S) | : Denter, Friedrich W. |

It is certified that error appears in the above-identified patent and that said Letters Patent is hereby corrected as shown below:

Column 7,
Line 53, please delete "plate and the contact" and insert in place therefore -- plate and contact --.

Column 8,
Line 39, please delete "claim 13" and insert in place therefore -- claim 11 --.

Signed and Sealed this

Twenty-second Day of March, 2005

JON W. DUDAS
*Director of the United States Patent and Trademark Office*